United States Patent
Tompkins, IV et al.

(10) Patent No.: US 7,894,625 B2
(45) Date of Patent: Feb. 22, 2011

(54) METHOD FOR DEVELOPING THREE DIMENSIONAL SURFACE PATTERNS FOR A PAPERMAKING BELT

(75) Inventors: Grant Edward Tompkins, IV, Fairfield, OH (US); Rebecca Howland Spitzer, Cincinnati, OH (US); Ward William Ostendorf, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1006 days.

(21) Appl. No.: 11/726,502

(22) Filed: Mar. 22, 2007

(65) Prior Publication Data

US 2008/0232638 A1 Sep. 25, 2008

(51) Int. Cl.
*G06K 9/00* (2006.01)
(52) U.S. Cl. ...................... 382/100; 382/154
(58) Field of Classification Search ........... 382/100, 382/154
See application file for complete search history.

(56) References Cited

U.S. PATENT DOCUMENTS

| | | | |
|---|---|---|---|
| 4,333,165 A | 6/1982 | Swainson et al. | |
| 4,514,345 A * | 4/1985 | Johnson et al. | 264/425 |
| 5,465,323 A | 11/1995 | Mallet | |
| 5,670,110 A | 9/1997 | Dirk et al. | |
| 5,751,852 A | 5/1998 | Marimont et al. | |
| 5,809,179 A | 9/1998 | Marimont et al. | |
| 6,405,151 B1 | 6/2002 | Fujii et al. | |
| 6,420,100 B1 | 7/2002 | Trokhan et al. | |
| 2002/0155257 A1 | 10/2002 | Schultz et al. | |
| 2005/0018902 A1 | 1/2005 | Liang | |
| 2007/0005168 A1 | 1/2007 | Hong et al. | |

FOREIGN PATENT DOCUMENTS

WO  WO 03/029542 A1  4/2003
WO  WO 2006/005003 A1  1/2006

OTHER PUBLICATIONS

Robert Stanley, The Complete Idiot's guide to Adobe Photoshop 5, Alpha Books, 1999, part 3, Layering it on the line, pp. 197-232.*
U.S. Appl. No. 11/726,561, filed Mar. 22, 2007, Tompkins, et al.

* cited by examiner

*Primary Examiner*—John B Strege
(74) *Attorney, Agent, or Firm*—Peter D. Meyer (57) ABSTRACT

A process for making an image for a papermaking belt wherein the image is the product of (a) providing an image; and (b) performing at least one image modification algorithm thereon, one of the at least one image modification algorithms being a beta image modification algorithm and the beta image modification algorithm being a three-dimensional image modification algorithm to provide a resultant image.

20 Claims, 8 Drawing Sheets

METHOD FOR DEVELOPING THREE DIMENSIONAL SURFACE PATTERNS FOR A PAPERMAKING BELT

FIELD OF THE INVENTION

This invention pertains to the method and apparatus for producing images for products, particularly papermaking belts, so that the image presents a three dimensional effect to the observer.

BACKGROUND OF THE INVENTION

Absorbent paper products are a staple of everyday life. Absorbent paper products are used as consumer products for paper towels, toilet tissue, facial tissue, napkins, and the like. The large demand for such paper products has created a demand for improved aesthetics and functional benefits in absorbent paper products, and as a result, has driven the need for novel methods for providing these visual effects and benefits to absorbent paper products.

Visual effects may be provided on an absorbent paper product by a number of techniques. For example, a pattern may be embossed onto the surface of a paper web as it is being converted. Alternatively, a pattern may be molded directly onto the surface of a paper web using a patterned papermaking belt. Patterns provided onto the surface of paper products not only provide the consumer with a positive visual appearance both at the time of purchase and during use, but may also provide a number of functional advantages. For example, a highly textured surface as can be provided by embossing or by the use of textured belts may increase the softness, absorbency, or caliper of a paper product.

With the advent and growth of the computer imaging industry there has been a rapid saturation of consumers with three dimensional computer graphics, images, and effects. Without being limited by theory, it is thought that consumers perceive the use of such three dimensional effects as denoting a product or good that is technologically advanced, in additional to providing an interesting visual experience to the consumer. As a result, many consumers prefer goods that provide such a three dimensional effect.

Accordingly, there exists the need to provide a means for providing an absorbent paper product having an aesthetically pleasing three dimensional surface pattern.

SUMMARY OF THE INVENTION

The present invention relates to a process for making an image for a papermaking belt wherein the image is the product of (a) providing an image; and (b) performing at least one image modification algorithm thereon, one of the at least one image modification algorithms being a beta image modification algorithm and the beta image modification algorithm being a three-dimensional image modification algorithm to provide a resultant image.

In another embodiment, the present invention relates to a process for making a papermaking belt comprising the steps of: (a) providing an image; (b) performing at least one image modification algorithm on the image, one of the at least one image modification algorithms being a beta image modification algorithm and the beta image modification algorithm being a three-dimensional image modification algorithm to provide a resultant image; (c) using the resultant image as a template to form a mask; (d) radiating a photosensitive resin that is disposed on the surface of a reinforcing element through the mask; and (e) removing the uncured photosensitive resin.

DETAILED DESCRIPTION OF THE INVENTION

Definitions

As used herein, "paper product" refers to any formed, fibrous structure products, traditionally, but not necessarily, comprising cellulose fibers. In one embodiment, the paper products of the present invention include tissue-towel paper products.

As used herein, "fibrous structure" or "fibrous structure product" refers to products comprising paper tissue or paper towel technology in general, including, but not limited to, conventional felt-pressed or conventional wet-pressed fibrous structure product, pattern densified fibrous structure product, starch substrates, and high bulk, uncompacted fibrous structure product. Non-limiting examples of tissue-towel paper products include disposable or reusable, toweling, facial tissue, bath tissue, table napkins, placemats, wipes, and the like.

As used herein, "image" refers to any figure, drawing, or other visual representation in any coordinate system. In one embodiment, an image is a simple geometric figure which may be selected from, but is not limited to: rectangles, squares, circles, triangles, ovals, polygons, quadrilaterals, and combinations thereof.

As used herein, "resultant image" refers to the consequent image after an image modification algorithm has been applied to an image.

As used herein, "image modification algorithm," also known to those of skill in the art as a "filter" refers to an algorithm that performs one or more mathematical operations on the mathematical expression of the image, and relates the operated on image to provide a resultant image. In other words, an image modification algorithm may change the visual appearance of an image. Exemplary mathematical operations that may be used as image modification algorithms include, but are not limited to, rotations, reflections and translations. For example a transformation performed in a two dimensional (sometimes referred to by those of skill in the art as "Euclidean") plane can move every point of the image by a fixed distance in the same direction or even shift the origin of the coordinate system to a new point. In other words, if v is a fixed vector, then the translation $T_v(p)$ about another vector v can be described mathematically as:

$$T_v(p)=p+v$$

An image modification algorithm may have one or more adjustable parameters or variables that affect the extent to which the mathematical operation may affect the resultant image (such as p in the above example). As a result, one image modification algorithm may be adjusted to provide different resultant images by changing the parameters, such as p, selected for each image modification algorithm.

As used herein, "resolution" refers the measure of sharpness of an image expressed as the total number of pixels, or points of color, per unit area, or the density of pixels, in the image.

As used herein, "raster image" also known to those of skill in the art as a "bitmap" refers to a data file or structure representing a grid of pixels in an image. Without wishing to be limited by theory, it is thought that the quality of a raster image is limited by the resolution and the type of information in each pixel (so called "color depth"). For example, an image sampled at 640×480 pixels (therefore containing 307,200 pixels) may not appear as clear as an image sampled at 1280×1024 (1,310,720 pixels) in the same area. Raster image may be distinguished from raster image in that vector images represent an image through the use of geometric objects such as curves and polygons while raster images are represented using pixels.

As used herein, "vector image" refers to images that may be comprised of one or more individual, scalable geometric objects, such as curves and polygons, which may be defined by a mathematical function. A non-limiting example of a vector image which can be described by a geometric object is a circle. The image made by the geometric object may be defined by the function:

$$f(r)=[(x-h)^2+(y-k)^2]^{1/2}$$

where h and k are the x- and y-coordinates of the center of the circle in a Euclidian plane and r is the radius of the circle. Thus a circle with radius of 5 units around the origin (x- and y-coordinates of 0) may be described as:

$$5=[x^2+y^2]^{1/2}$$

Because a vector image may be defined mathematically, changing the parameters of a vector image does not affect the object itself, but merely modifies the object. In other words, it is possible to freely change any number of parameters without causing a loss of resolution as the image is modified or scaled to a larger size. For example, the circle with a radius of 5 units as described above can be scaled to a circle of radius 10 units by simply altering the radius (a parameter):

$$10=[x^2+y^2]^{1/2}$$

Alternatively, the circle may be scaled and translated so that it has a radius of 6 units and is no longer centered about the origin, but centered about the x-coordinate −2 and the y-coordinate +3:

$$6=[(x+2)^2+(y-3)^2]^{1/2}$$

As used herein, "vectorize" or "vectorizing" refers to the process of converting any raster image to a vector image. It is known in the art that raster images which have been vectorized can be rescaled without quality loss. A nonlimiting example of a method for converting a raster image to a vector image is to replace the pixels in a raster image with geometric objects to form a vector image. This conversion can be done manually or using a software package such as Adobe Illustrator™, CorelDRAW!™, and Adobe Streamline™. Without being limited by theory, many software packages trace lines around a raster image and assign geometric objects to the traced outline of the raster image. Another example of a method of converting a raster image to a vector image is in U.S. Pat. No. 5,715,331.

As used herein, "industrially usable format" refers to any file type that can be used as a template for the creation of any article of manufacture. Nonlimiting examples of articles of manufacture include, but are not limited to: a patterned belt, emboss roll, or print roll. Examples of industrially usable formats include, but are not limited to: Computer Aided Design or CAD (*.dwg or *.dxf) format and Adobe Illustrator™ (*.ai) format.

As used herein, "fibrous structure" as used herein means an arrangement of fibers produced in any papermaking machine known in the art to create a ply of paper. "Fiber" means an elongate particulate having an apparent length greatly exceeding its apparent width. More specifically, and as used herein, fiber refers to such fibers suitable for a papermaking process. The present invention contemplates the use of a variety of paper making fibers, such as, natural fibers, synthetic fibers, as well as any other suitable fibers, starches, and combinations thereof. Paper making fibers useful in the present invention include cellulosic fibers commonly known as wood pulp fibers. Applicable wood pulps include chemical pulps, such as Kraft, sulfite and sulfate pulps; mechanical pulps including groundwood, thermomechanical pulp; chemithermomechanical pulp; chemically modified pulps, and the like. Chemical pulps, however, may be preferred in tissue towel embodiments since they are known to those of skill in the art to impart a superior tactical sense of softness to tissue sheets made therefrom.

Pulps derived from deciduous trees (hardwood) and/or coniferous trees (softwood) can be utilized herein. Such hardwood and softwood fibers can be blended or deposited in layers to provide a stratified web. Exemplary layering embodiments and processes of layering are disclosed in U.S. Pat. Nos. 3,994,771 and 4,300,981.

Additionally, fibers derived from non-wood pulp such as cotton linters, bagesse, and the like, can be used. Additionally, fibers derived from recycled paper, which may contain any or all of the pulp categories listed above, as well as other non-fibrous materials such as fillers and adhesives used to manufacture the original paper product may be used in the present web. In addition, fibers and/or filaments made from polymers, specifically hydroxyl polymers, may be used in the present invention. Non-limiting examples of suitable hydroxyl polymers include polyvinyl alcohol, starch, starch derivatives, chitosan, chitosan derivatives, cellulose derivatives, gums, arabinans, galactans, and combinations thereof. Additionally, other synthetic fibers such as rayon, lyocel, polyester, polyethylene, and polypropylene fibers can be used within the scope of the present invention. Further, such fibers may be latex bonded. Other materials are also intended to be within the scope of the present invention as long as they do not interfere or counter act any advantage presented by the instant invention.

As used herein, "Machine Direction" or "MD" means the direction parallel to the flow of the fibrous structure through the papermaking machine and/or product manufacturing equipment.

As used herein, "Cross Machine Direction" or "CD" means the direction perpendicular to, and coplanar with, the machine direction of the fibrous structure and/or fibrous structure product comprising the fibrous structure.

As used herein, "Z-direction" means the direction normal to a plane formed by machine direction and cross machine directions.

Process for Producing a 3-D Image

Figure 1:
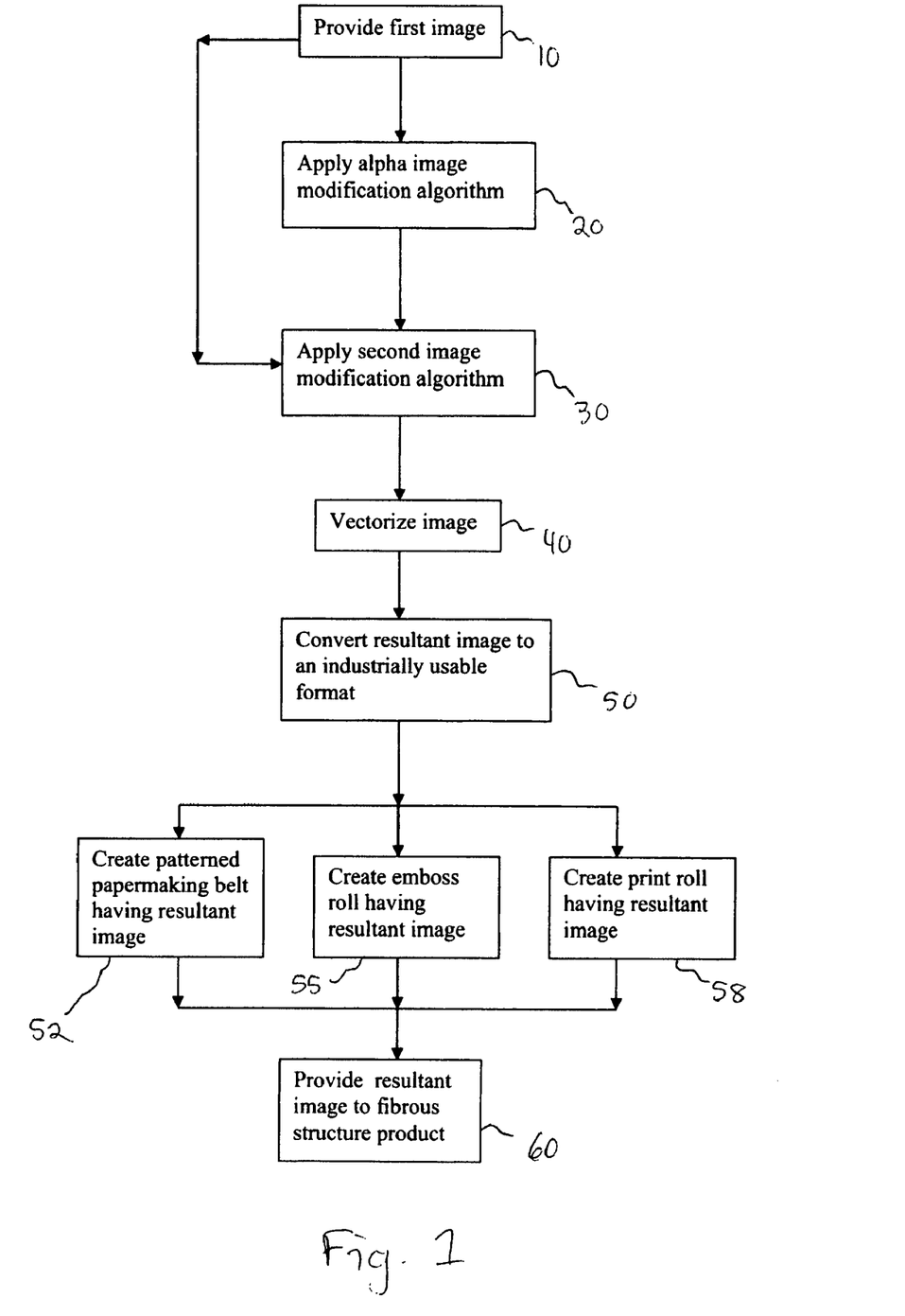
FIG. 1 is an exemplary flow diagram illustrating a method of creating surface patterns for cellulosic fibrous structure products.

FIG. 1 is a flow chart illustrating the steps of one embodiment of the present method for developing three dimensional surface patterns for fibrous structure products. Referring to FIG. 1, a first image 10 is provided by the user. This first image 10 may be provided by any means known in the art. In an exemplary embodiment, the first image may be created using a software program that will be performing the image modification algorithm(s), by hand (outside of a computer), or by using a computer software program that can be different from the one that will be applying the image modification algorithm to the first image. In one embodiment, a first image 10 may be drawn by hand outside of the computer. If the first image 10 is drawn by hand, then one of skill in the art may appreciate that an optical scanner may be used to scan such a hand-drawn image into an image file format. The software can then apply the image modification algorithms to the resulting image file. If the first image 10 is drawn using a different software program than what will be used to perform image modification algorithms, then that image should be saved in an image file format that will be usable by the software that will perform the image modification algorithms. Nonlimiting examples of image files are jpeg (.jpg) or tiff (.tiff) files.

The first image may then be modified using an alpha image modification algorithm 20. By convention herein, an alpha image modification algorithm 20 may be a two dimensional image modification algorithm. An alpha image modification algorithm 20 can be repeated any number of times with any combination or sequence of image modification algorithms to create a variety of resultant images. An alpha image modification 20 may be performed using any suitable software package. Nonlimiting examples of suitable software packages for performing two dimensional image modifications include: Adobe Photoshop™, Adobe Illustrator™, Adobe After Effects™, Cinema 4D™, Maya™, 3D Studio Max™, Lightwave 3D™, the like, and combinations thereof. Examples of two dimensional image modification algorithms include, but are not limited to: tile (which replicates a single object any number of times), kaleidoscope (which divides an image into smaller parts, replicates the smaller parts and then rotates the replicated parts), blur (which diffuses the pixels which comprise a raster image), the like and combinations thereof. The terms given as examples are those from the Apple Motion™ software package. It should be understood by those of skill in the art that the terms used to describe two dimensional image modification algorithms can be purely arbitrary when compared to the actual mathematical operation(s) that are used because similar image modification algorithms may have different names in different software packages.

The image that results from the first image modification algorithm 20 may be further modified by applying a beta image modification algorithm 30. Alternatively, in one embodiment, the first image 10 may be modified by applying a beta image modification algorithm 30 without having been modified by an alpha image modification algorithm 20. By convention, a beta image modification algorithm 30 is a three dimensional image modification algorithm. It is believed that the image that results from an alpha image modification algorithm 20 may be modified by any number of additional alpha image modification algorithms 20 before being modified by a beta image modification algorithm 30. Without being limited by theory, it is thought that a beta image modification algorithms can be visually differentiated from two-dimensional image modification algorithms because three-dimensional image modification algorithms create an apparent difference in scale or sense of depth. Further, in one embodiment, a beta image modification algorithm applied to an image causes the resultant image have a "falloff effect" at the edges of the resultant image. A falloff effect may be described as having the appearance of the edges gradually dropping off in the z-direction. Examples of three dimensional imaging software packages include, but are not limited to: Cinema 4D™, Maya™, Apple Motion™, 3D Studio Max™, the like and combinations thereof. Within Apple Motion™ examples of three dimensional image modification algorithms include, but are not limited to: black hole (which creates a hole in the image having a falloff effect at the resultant edges of the image around the circle), bulge (which creates a circle in the image and maps the pixels within the circle from a Cartesian coordinate system onto a polar coordinate system), disc warp (which chooses a section of an image, rotates that section, and then creates a falloff effect at the edges of that section), the like and combinations thereof.

Once the beta image modification algorithm 30 is applied, the resultant image may be converted from a raster image to a vector image 40 using any means known in the art. The vector image 40 may be converted to an industrially usable format 50 such as, but not limited, to a Computer Aided Design (CAD) (*.dwg or *.dxf) format or Adobe Illustrator (*.ai) format. The industrially usable format 50 may then be used as a template to make a papermaking belt 52, embossing roll 55, or pattern for a print roll 58 as described infra. The process describing the construction of a papermaking belt is described in the "Papermaking Belt" section below. The resultant image can then be provided to a fibrous structure product 60.

Figure 2:
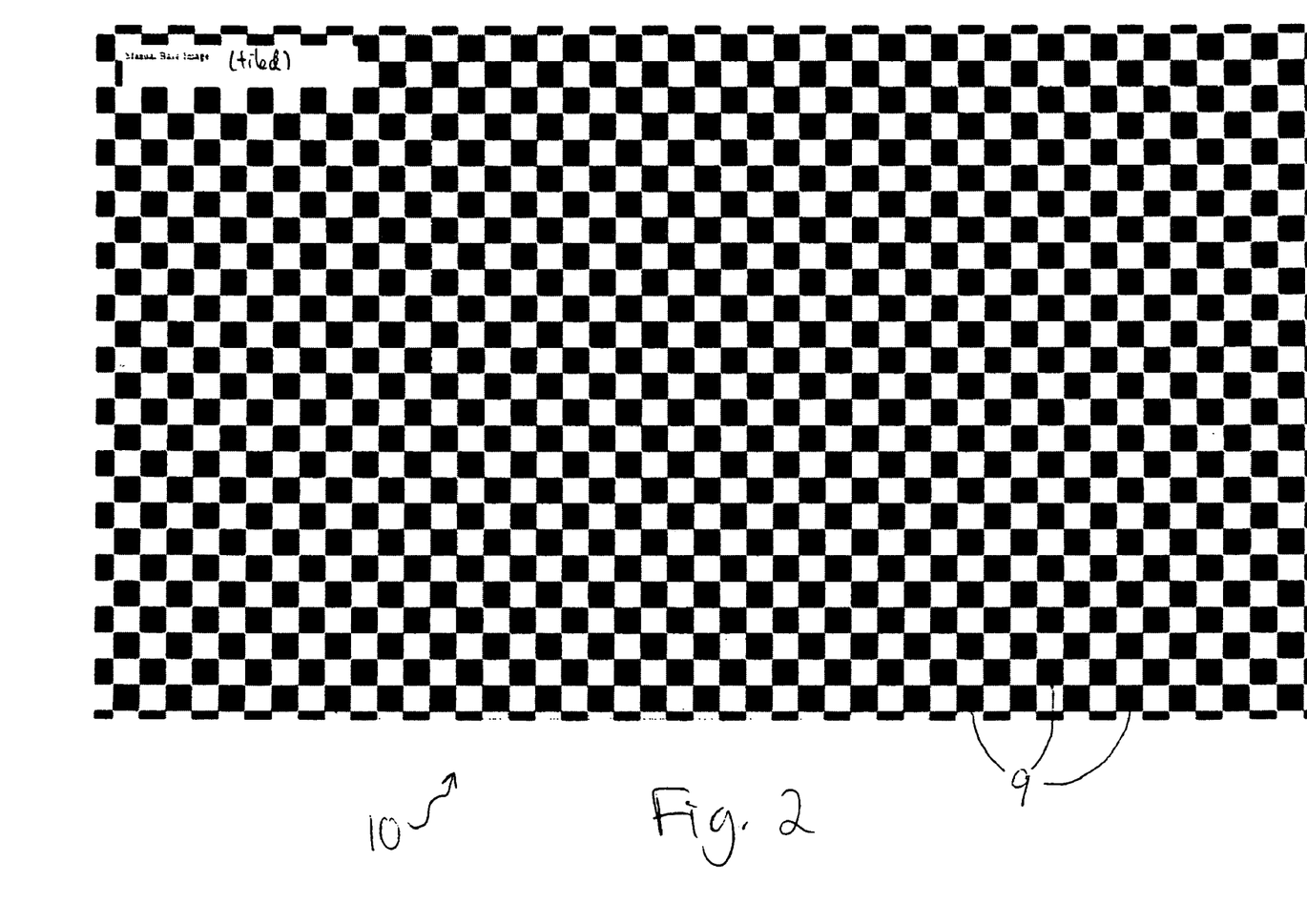
FIG. 2 is a top plan view of an exemplary image. The image being a "checkerboard."

FIG. 2 is an exemplary embodiment of a first image 10. In the exemplary embodiment the first image 10 is a checkerboard having squares 9 with a solid color fill that are arranged diagonally from one another. The first image 10 may be created by hand drawing or by using any software drawing applications as discussed supra. In the exemplary embodiment, the checkerboard is created using the "checkerboard" function in the Apple Motion™ software program.

Figure 3:
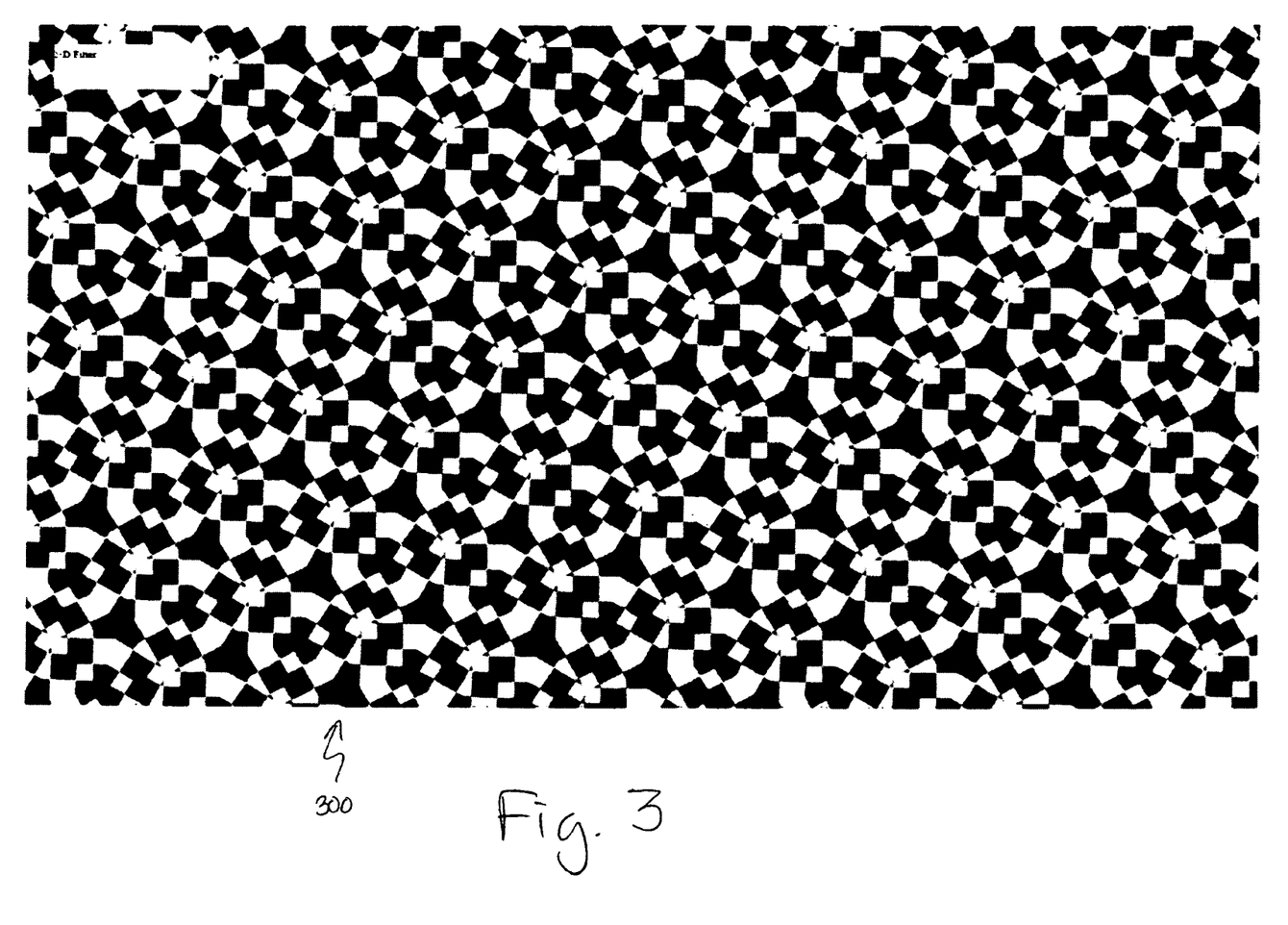
FIG. 3 is a top plan view of an exemplary resultant image of FIG. 2 after a "triangular tile" image modification algorithm has been applied.

FIG. 3 is an exemplary embodiment of the image first image 10 of FIG. 2 after an alpha image modification algorithm has been applied to the first image 10. In this exemplary embodiment the alpha image modification algorithm is a "triangular tile" algorithm used in the Apple Motion™ software package. In the exemplary embodiment, the alpha image modification algorithm divides the checkerboard pattern into smaller pieces and rotated those pieces to form a first resultant image 300.

Figure 4:
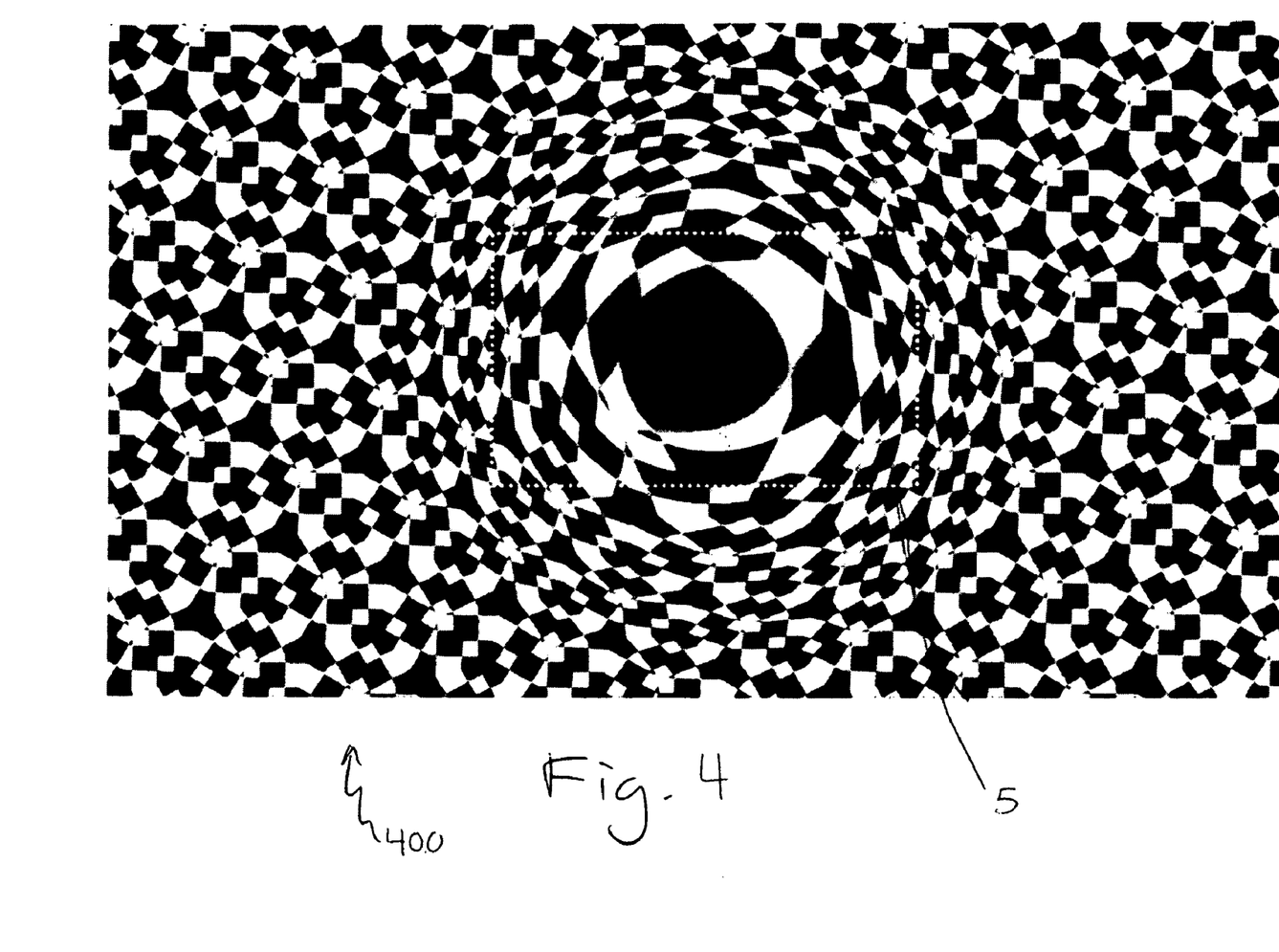
FIG. 4 is a top plan view of an exemplary resultant image of FIG. 3 after a "bulge" image modification algorithm has been applied.

FIG. 4 is an exemplary embodiment of the first resultant image 300 of FIG. 3 after a beta image modification algorithm is applied. In this exemplary embodiment the beta image modification is a three dimensional image modification algorithm. Specifically, the algorithm is a "bulge" algorithm used in the Apple Motion™ software package. In the exemplary embodiment, the beta image modification algorithm identified a circular area within the first resultant image 300 and mapped the points from a Cartesian coordinate system within the circular area onto a polar coordinate system within the circular area to yield a second resultant image 400.

Figure 5:
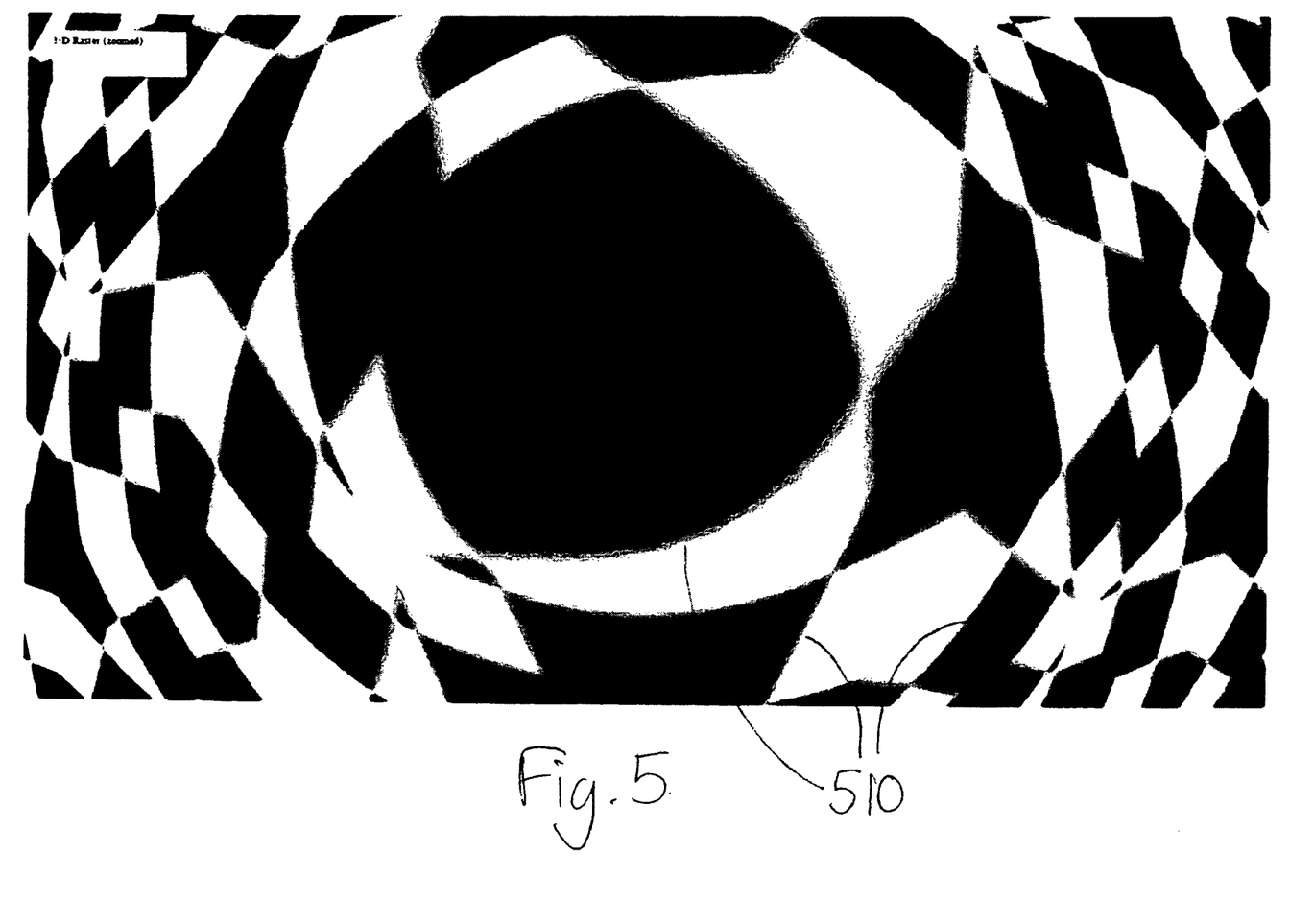
FIG. 5 is an expanded top plan view of the image of FIG. 4 by the region labeled 5.

FIG. 5 is a magnified view of FIG. 5 taken within the area defined as 5. As can be seen in FIG. 5, the border lines 510 that define the shapes of the pattern appear to be grainy and are not crisp due to any scaling or rotation from the image modification algorithms only operating on pixels and not on geometric objects.

Figure 6:
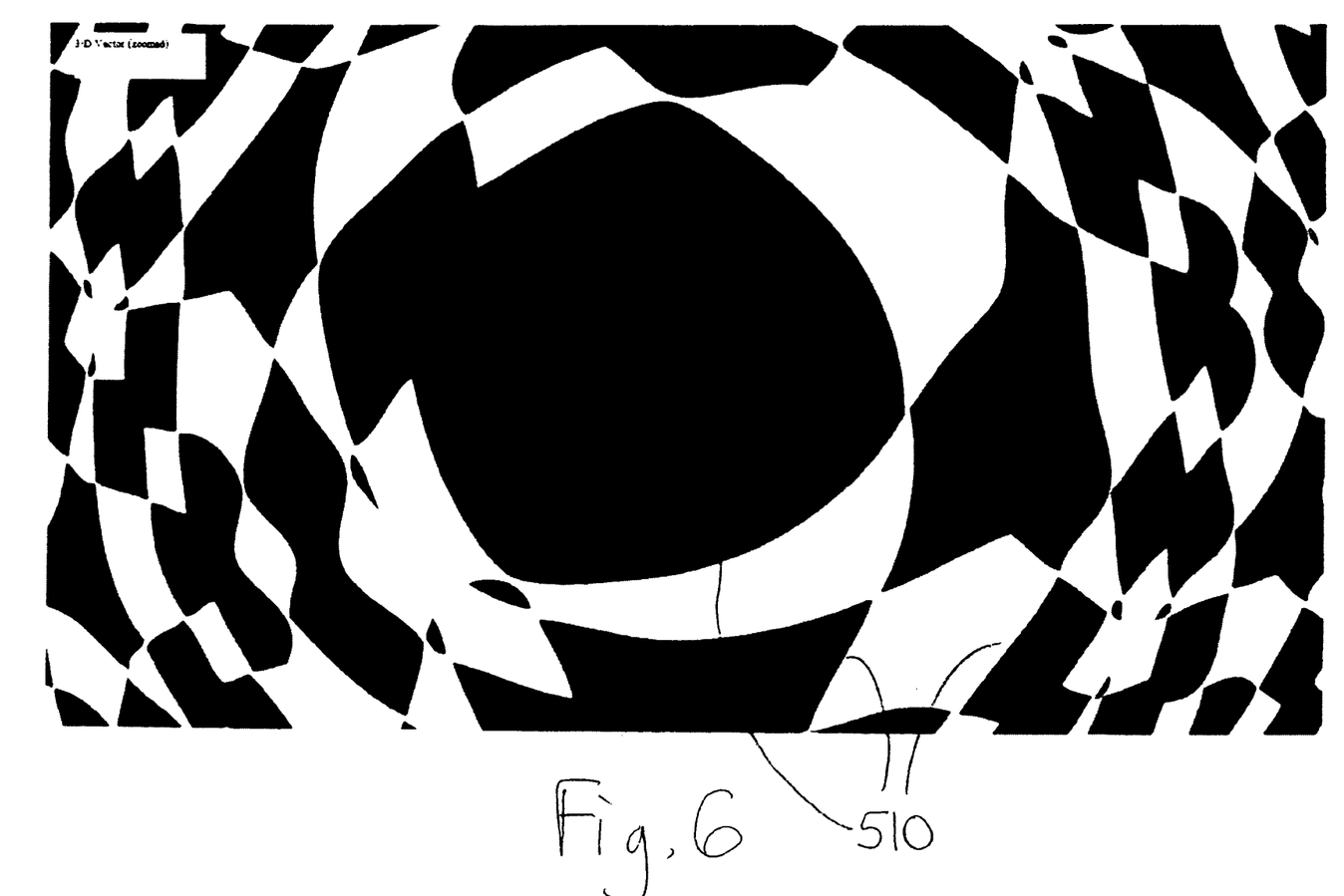
FIG. 6 is a top plan view of an exemplary resultant image of FIG. 5 after vectorization.

FIG. 6 is a view of FIG. 5 once the image of FIG. 5 has been converted from a raster image to a vector image using the automatic vectorization feature in the Apple Motion™ software package. As can be seen in FIG. 6, once vectorized, the border lines 510 that define the shapes of the pattern are crisp because the image modification algorithm was able to operate on a geometric object rather than operating on pixels. As discussed supra, vectorizing an image defines that image in terms of mathematical functions that can be scaled and manipulated without a loss of image data.

Papermaking Belt Having a Three Dimensional Image Thereon

The images of the present invention may be applied to the surface of the fibrous structure product by any means known in the art. For example, the images can be applied via application of ink to the surface of the fibrous structure product. Suitable processes for applying the ink to a roll and then from the roll to the fibrous structure product by printing include, but are not limited to lithography, letter press, gravure, screen printing, intaglio, and flexography. The method for transferring an image of the present invention to a print roll or other printing mechanism may be done using any method that is known in the art. An exemplary embodiment of using ink to create surface patterns on fibrous structure products is disclosed in U.S. Pat. No. 7,037,575.

Alternatively, the images may be imparted to the fibrous structure product by embossing. The present invention images may be transferred to an embossing roll using any means known in the art. Knob to knob embossing is well known in the art as illustrated by commonly assigned U.S. Pat. No. 3,414,459. The images may also be imparted to the fibrous structure product by nested embossing as illustrated by U.S. Pat. No. 4,320,162. In addition, the images may be imparted to the fibrous structure product by dual ply lamination embossing as illustrated by U.S. Pat. No. 5,468,323.

Patterned Belt

Patterned belts can also be used to apply images to fibrous structure products. Processes for using patterned belts to make fibrous structure products that have some image thereon include, but are not limited to those processes disclosed in U.S. Pat. Nos. 3,301,746, 3,974,025, 4,239,065, 4,528,239, and U.S. Pat. Application No. 60/855576.

Figure 7A:
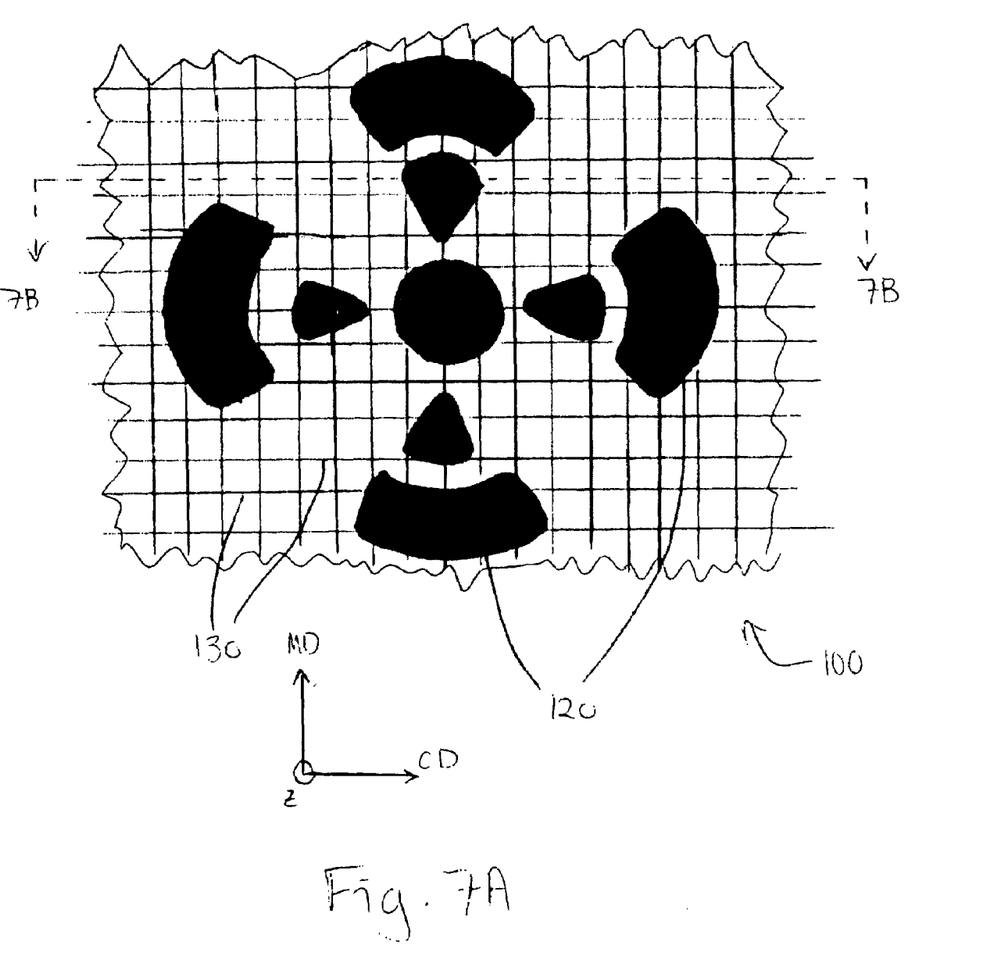
FIG. 7A is a fragmentary top plan view of an exemplary embodiment of a papermaking belt.

FIG. 7A is an exemplary embodiment of a portion of a papermaking belt 100 produced according to the present invention. The papermaking belt 100 may be used as a through air drying belt, a forming wire, a backing wire for a twin wire former, a transfer belt, or, with appropriate batting, as a press felt, etc. Except as noted, the following discussion is directed to through air drying belt although the foregoing executions are contemplated to be within the scope of the invention.

The papermaking belt 100 has a machine direction, a cross machine direction, and a thickness extending in a Z-direction perpendicular to the plane formed by the machine and cross machine directions that may receive a slurry of fibers that form the fibrous structure product. Without being limited by theory, it is thought that deflection conduits within the framework mold the slurry of fibers as the fibrous structure product is formed. As a result, the framework may be used to impart an image onto the surface of the fibrous structure product. The papermaking belt 100 comprises two primary components: a framework 120 and a reinforcing element 130. The framework 120 may comprise any suitable material, including, without limitation, a resinous material (such as a photosensitive resin), a plastic, a metal, metal-impregnated polymers, a molded or extruded thermoplastic or pseudo-thermoplastic material, and in one embodiment comprises a cured polymeric photosensitive resin.

Figure 7B:
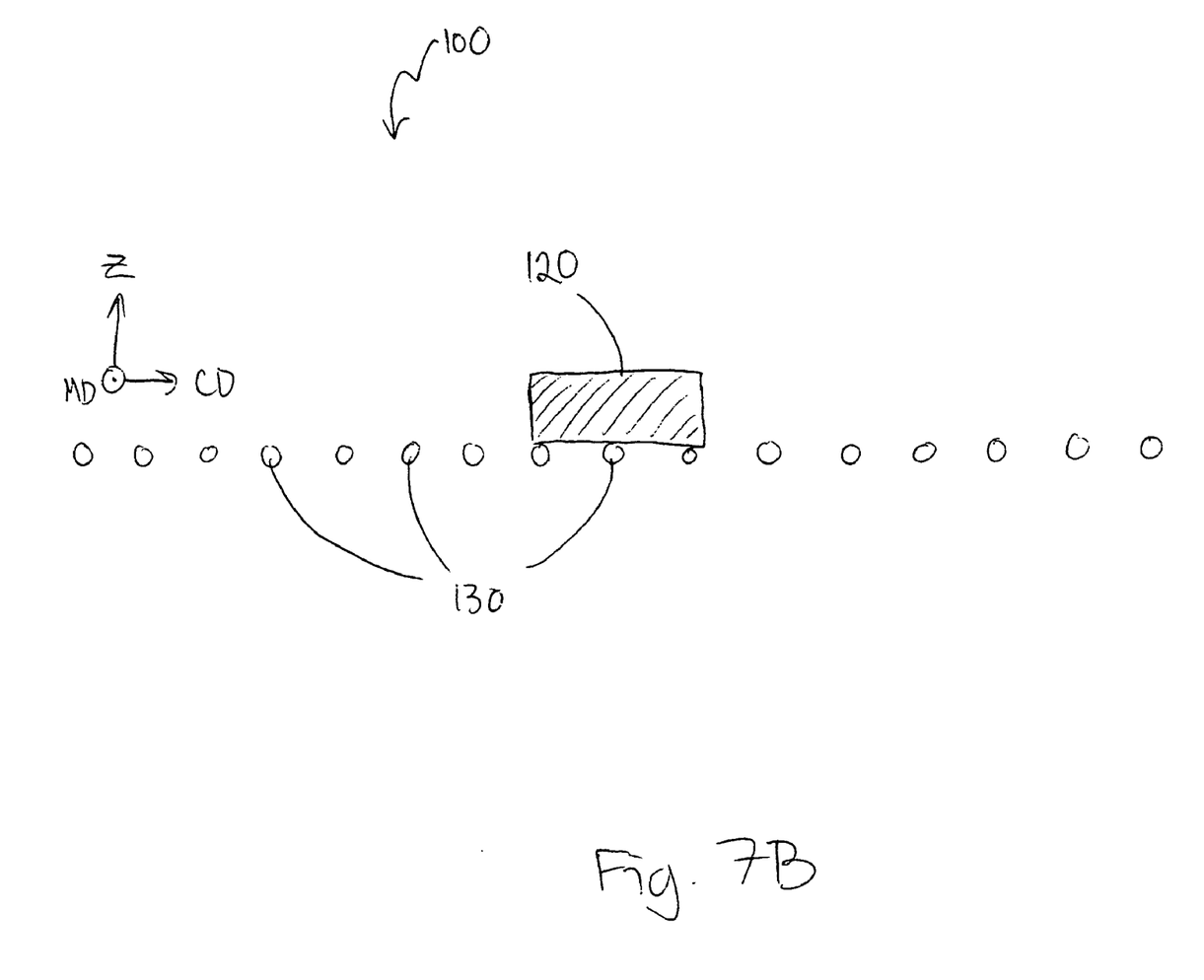
FIG. 7B is a cross sectional view of the papermaking belt of FIG. 7A taken along line 7B-7B.

FIG. 7B is a cross-sectional view of FIG. 7A taken along lines 7B-7B showing the relationship of the belt 100, framework 120, and reinforcing element 130 in the Z-direction.

The reinforcing element 130 may comprise a woven fabric as is known in the art. The reinforcing element 130 may be fluid-permeable, fluid-impermeable, or partially fluid-permeable (meaning that some portions of the reinforcing element may be fluid-permeable while other portions thereof may not be). Examples of the reinforcing element include, but are not limited to, a woven element, a felt, a mesh wire, or combinations thereof.

Exemplary Method of Making a Patterned Belt

The papermaking belt 100 according to the present invention may be made by curing a photosensitive resin through a mask. A mask may be made using any means known in the art. Nonlimiting examples of methods for making masks for photoradiation purposes are described in U.S. Pat. Nos. 3,877,810, 4,374,911, 6,783,898 and U.S. Pat. App. No. 2004/0126710 A1. In one embodiment, an image produced according to the present invention that is in an industrially usable format 50 may be used as a template to form the mask. In one embodiment, the industrially usable format 50 may be saved as an Encapsulated Postscript (or *.eps) file format and then opened using a software printing program such as, but not limited to, Wasatch SoftRIP™, that may take the resultant image from the *.eps file and repeat the resultant image over a user-specified length and width. The software printing program will then print the image onto a transparent surface to form a mask having first regions which are transparent to actinic radiation and second regions which are opaque to the actinic radiation. In one embodiment, the printing can be done in one step by transferring the ink to a transparent film using a printer such as, but not limited to a Hewlett Packard™ Design Jet 5000.

The regions in the mask which are transparent to the actinic radiation will form like regions in the photosensitive resin which cure and become the framework 130 of the papermaking belt 100. Conversely, the regions of the mask which are opaque to the actinic radiation will cause the resin in the corresponding positions to remain uncured. Uncured resin may be removed during the beltmaking process and does not form part of the papermaking belt 100. Because the mask will determine what the surface of the belt will look like, the mask may be patterned according to any image that may be created as discussed supra.

The belt of the present invention may be formed by a process comprising the following steps: First, providing a coating of a liquid curable material. In one embodiment the liquid curable material is a photosensitive resin. The coating can be applied by any means known in the art. In one embodiment the coat is provided by dispensing liquid curable material through a nozzle. The thickness of the coating can be controlled by, for example, a roll, a bar, a knife, or any other suitable means known in the art. In one embodiment the coating of liquid curable material is supported by a forming surface, the coating having a first thickness. Second, providing a source of actinic radiation to cure the liquid curable material. In one embodiment, the source of actinic radiation may be a lamp having a bulb capable of providing light at the appropriate wavelength to cure the liquid curable material. Third, providing a mask having a pre-selected pattern of transparent regions and opaque regions that correspond to an image therein and positioning the first mask between the coating of the curable material and the source of curing radiation so that the opaque regions of the first mask shield areas of the coating from the curing radiation while the transparent regions of the first mask cause other areas of the coating to be unshielded. Fourth, curing the unshielded areas of the coating by exposing the coating to the actinic radiation through the mask having an image thereon. The shielded areas of the coating uncured. Fifth, removing substantially all uncured liquid curable material from the partly-formed first layer to leave a hardened or semi-hardened material structure. Sixth, removing substantially all uncured liquid curable material from the cured layer to leave a hardened material or semi-hardened material structure that corresponds to the negative tone of the image described infra.

In one embodiment, a backing film may be provided and positioned between the forming surface and the coating of a liquid photosensitive resin, to protect the forming surface from being contaminated by the liquid resin. If the papermaking belt having a reinforcing element is desired, the process may further include steps of providing a suitable reinforcing element supported by the forming surface, the reinforcing element having a paper facing side and a machine facing side, and depositing the first or second coating of a liquid photosensitive resin to the paper facing side of the reinforcing element.

Products

The fibrous structure product may comprise a tissue-towel paper product known in the industry. Embodiment of these substrates may be made according U.S. Pat. Nos. 4,191,609, 4,300,981, 4,191,609, 4,514,345, 4,528,239, 4,529,480, 4,637,859, 5,245,025, 5,275,700, 5,328,565, 5,334,289, 5,364,504, 5,527,428, 5,556,509, 5,628,876, 5,629,052, 5,637,194, and 5,411,636; European Patent 677,612; U.S. Patent App. No. 2004/0192136A1 and U.S. Provisional Patent No. 60/855499.

In one embodiment, the fibrous structure product may be manufactured via a wet-laid paper making process. In other embodiments, the fibrous structure product may be manufactured via a through-air-dried paper making process or foreshortened by creping or by wet microcontraction. In some embodiments, the resultant plies of fibrous structure may be differential density fibrous structure plies, wet laid fibrous structure plies, air laid fibrous structure plies, conventional fibrous structure plies, and combinations thereof. Creping and/or wet microcontraction are disclosed in U.S. Pat. Nos. 6,048,938, 5,942,085, 5,865,950, 4,440,597, 4,191,756, and 6,187,138.

EXAMPLE

Making a Three Dimensional Image

One embodiment of creating an image in an industrially usable format that could be used for making a paper product with a three dimensional surface pattern according to the present invention includes the following components: An Apple Mac™ computer with the Apple Motion™ and Adobe Illustrator™ software packages installed.

The steps used to create a paper product with a three dimensional surface pattern the following steps are:

Creating the Three Dimensional Pattern

1. Launch the Apple Motion(™) software package. Using the "library" tab, choose the "generators" option. From that option choose the "checkerboard" and drag it onto the stage.
2. From the "library" tab choose the "Triangular Tile" effect located in the "Image Units" sub folder with the base image selected. Adjust the "angle" and "width" parameters to produce the desired effect.
3. From the "library" tab choose the "bulge" effect in the Distortion sub folder with the base image selected. Adjust the "amount" and "scale" parameters to produce the desired effect.
4. Go to the "file" tab and choose "export."
5. Change the export time from "movie" to "single frame" and export the frame as an image format (*.jpg/JPEG).
6. Close Apple Motion™ and launch Adobe Illustrator™
7. Import the exported 2D pattern into Adobe Illustrator by dragging the exported file onto the canvas from the file browser.
8. Select the image and in the upper toolbar, choose "live trace." Adjust the parameters for Live Trace. Leave all parameters at the default levels except disable the "stroke" parameter, choose "only" option in the "fill" parameter, and adjust the "edge tolerance" parameter to produce the desired effect.
9. Click on the image to select it and choose "expand" from the top toolbar.
10. From the file tab choose "export." When asked what kind of file to export, choose the AutoCad format (*.dwg).
11. With the CAD file in hand, a patterned belt as described above can be made using any means known in the art for making a mask.

All publications, patent applications, and issued patents mentioned herein are hereby incorporated in their entirety by reference. Citation of any reference is not an admission regarding any determination as to its availability as prior art to the claimed invention.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for making an image for a papermaking belt wherein the image is the product of:
    (a) providing an image, said image being a simple geometric figure;
    (b) performing a first alpha image modification algorithm on said image, said first alpha image modification algorithm being a tile algorithm;
    (c) performing a first beta image modification algorithm upon said image to provide a resultant image, said beta image modification algorithm being a three-dimensional image modification algorithm; and,
    (d) using said resultant image to form a pattern for said papermaking belt.

2. The process according to claim 1 further comprising the step of:
    (d) modifying the image with a second alpha image modification algorithm.

3. The process according to claim 2 wherein said step (d) is performed before said step (c).

4. The process according to claim 3 wherein the second alpha image modification algorithm is selected from the group consisting of tile, kaleidoscope, blur, and combinations thereof.

5. The process according to claim 2 further comprising the step of:
(e) modifying the image with at least a third alpha image modification algorithm.

6. The process according to claim 5 wherein said step (e) is performed before said step (c).

7. The process according to claim 1 further comprising the step of:
(d) vectorizing the resultant image.

8. The process according to claim 7 wherein said step (d) is performed after said step (c).

9. The process according to claim 1 further comprising the step of
(d) converting the resultant image to an industrially usable format.

10. A process for making a papermaking belt comprising the steps of:
(a) providing an image, said image being a simple geometric figure;
(b) performing a first alpha image modification algorithm on said image, said first alpha image modification algorithm being a tile algorithm;
(c) performing a first beta image modification algorithm upon said image to provide a resultant image, the beta image modification algorithm being a three-dimensional image modification algorithm;
(d) using the resultant image as a template to form a mask;
(e) radiating a photosensitive resin that is disposed on the paper facing side of a reinforcing element through the mask; and
(f) removing the uncured photosensitive resin; any cured resin forming said resultant image on said paper facing side of said papermaking belt.

11. The process according to claim 10 further comprising the step of:
(g) modifying the image with a second alpha image modification algorithm.

12. The process according to claim 11 wherein said step (g) is performed before said step (c).

13. The process according to claim 11 wherein the second alpha image modification algorithm is selected from the group consisting of tile, kaleidoscope, blur, and combinations thereof.

14. The process according to claim 11 further comprising the step of:
(h) modifying the image with at least a third alpha image modification algorithms.

15. The process according to claim 14 wherein said step (h) is performed before said step (c).

16. The process according to claim 10 further comprising the step of:
(i) vectorizing the resultant image.

17. The process according to claim 16 wherein said step (i) is performed after said step (c).

18. The process according to claim 10 further comprising the step of:
(j) converting the resultant image to an industrially usable format.

19. The process according to claim 18 wherein step (j) further comprises the step:
(k) printing the industrially usable format onto a transparent surface to form a mask.

20. The process according to claim 10 wherein the papermaking belt further comprises a negative-tone image of the resultant image.

* * * * *